3,457,346
PROCESS FOR THE MANUFACTURE OF HIGHLY PURIFIED GONADOTROPINS
Hans Van Hell, Oss, Netherlands, assignor to Organon Inc., West Orange, N.J., a corporation of New Jersey
No Drawing. Filed Dec. 13, 1965, Ser. No. 513,561
Claims priority, application Netherlands, Jan. 15, 1965, 6500460
Int. Cl. A61k *17/08;* C07c *167/42*
U.S. Cl. 424—100      7 Claims

ABSTRACT OF THE DISCLOSURE

Highly purified gonadotropins are obtained from an impure concentrate thereof, by contacting an aqueous solution of the gonadotropin with an ion-exchanging cross-linked polydextran, then eluting the gonadotropin from the polydextran with at least one buffer solution having a concentration of 0.1–1.0 molar and a pH between about 4.5 and 8.4, and then separating the gonadotropin from the fraction obtained.

---

The invention relates to the manufacture of highly purified gonadotropins from less pure concentrates by chromatography.

By gonadotropins or gonadotropic hormones are meant hormones originally demonstrated in the anterior lobe of the pituitary gland and in urine. Further they were found in serum and in the placenta and urine of pregnant women and in the endometrium tissue and serum of pregnant mares. Gonadotropins are capable of stimulating ovaria and testes and bringing about in them morphological and functional changes. These substances are protein-like and water-soluble. They differ according to their origin and chemical pretreatment.

The following two groups of gonadotropins may be distinguished:

(a) Gonadotropins occurring in the pituitary anterior lobe. This group comprises the FSH (follicle stimulating hormone), the ICSH (interstitial cell stimulating hormone) and the prolactin or lactogenic hormone.

(b) Gonadotropins isolated from raw materials other than the pituitary anterior lobe. This group chiefly comprises:

(1) Chorionic or placental human gonadotropin (HCG), which may be isolated from the placenta and urine of pregnant women.

(2) Gonadotropins from urine of castrates and of women in their menopause (HMG).

(3) Serum-gonadotropins occurring in the serum of pregnant mares (PMSG).

The HMG to be recovered from human urine, which HMG contains FSH, is a therapeutically valuable preparation. The HCG, which can be prepared from the urine of pregnant women, is used in therapy and is also of importance currently in immunochemical determinations of this hormone, for instance in pregnancy tests and the diagnosis of tumors excreting this hormone. The serum-gonadotropin (PMSG), which can be prepared from the serum of pregnant mares and in which the FSH activity dominates, stimulates the follicle maturation, the spermatogenesis and the interstitium of the ovarium and the testis, and is therefore also of therapeutical importance. It is clear that purification of these hormones to avoid undesired side-reactions is of great importance both in the therapy and in the immunochemical determination methods.

W. R. Butt et al. describe in Biochem. J. 81, 596 (1961) the purification of gonadotropins for human urine and pituitary glands by chromatography, using carboxymethyl (CM) cellulose and diethylaminoethyl (DEAE) cellulose and calciumphosphate, substances which do not posses the properties of a molecular sieve and are less suitable for the manufacture of preparations of high activity. In this manner Butt et al. manufactured HMG preparations of an FSH activity of at most 350 U. per mg. Usually the application of DEAE cellulose, which may vary strongly as regards its properties from lot to lot, has the disadvantage that the results are poorly reproducible. Further the capacity of this surface adsorbent is relatively small, which especially in the separation of high molecular weight substances of about equal molecular size gives rise to less good results by the overlapping of the components.

In Acta Endocrinol. 41, 1 (1962) G. Bettendorf et al. describe the application of a DEAE Sephadex in the purification of a fraction of a gonadotropin preparation from human pituitary glands. They find, however, that a slight increase in activtity is attended with a heavy loss of active substance, so that this method had to be deemed unfit for the recovery of highly purified gonadotropins.

Surprisingly it now has been found that highly purified gonadotropins may be obtained in high yield, when an aqueous solution of an impure concentrate is combined with an ion-exchanging material which has also the properties of a molecular sieve, followed by elution of the active substances from it with one or more buffer solutions and separation of these substances from the fractions obtained, whereupon they are further purified, if desired, by submitting them to gel filtration.

Thus it is possible for instance to manufacture preparations with an activity of 5500 to 11000 I.U. per mg. starting from a HCG preparation with an activity of 2700 to 6500 I.U. per mg. by chromatography only over a molecular sieve with ion-exchanging capacity, after which, if desired, a further increase in the activity may be obtained, for instance of 10500 I.U. to 19000 I.U. per mg., by gel filtration. HMG preparations of some hundreds of mg. equivalent IRP per mg. may thus be concentrated to well over 2000 mg. equivalent IRP per mg.

Yields of active material are very good; thus it proved to be possible to obtain from a HCG preparation of 3000 I.U. per mg. for instance a concentration of 7000 I.U. per mg. containing 70% of the originally present amount of units, and from a HCG preparation of 5000 I.U. per mg. for instance a concentration with an activity of 10500 I.U. per mg. giving a yield of units of 77%. Hence the present, very selective method of the invention constitutes an important development in the preparation on a factory scale of highly purified gonadotropins.

It is to be preferred to start from not too crude hormone preparations, such as obtained from precipitation in accordance with the Netherlands patent application No. 6,500,460. This method comprises adding one or more suitable acids to a clear solution of a crude gonadotropin preparation having a mole fraction of alcohol of at least 0.33, a pH between 6 and 9, and one or more salts soluble in water-alcohol mixtures, which salts have a mole fraction of at most 0.016 and a mole fraction of water between 0.50 and 0.65 until the measured pH has reached a value between about 3 and 6, simultaneously raising the alcohol concentration to precipitate the hormone.

In the purification of HCG preparations by the present method it is to be preferred to start from concentrations having at least about 2000 I.U. per mg. Naturally, final products of a higher activity can be obtained in proportion as the starting material is at a more advanced stage of purification.

Further, experience has proved that gels of polysaccharides, for instance dextran, in which by chemical treatment so-called side-chains have been formed and carboxymethyl groups introduced, such as are known commercially by the name of CM Sephadex, e.g. the types C25 and C50, have a highly separative property for those hormones of the group of the cycloproteins and the natural contamination occurring therein. Other substances, too, having the activity of a molecular sieve and ion-exchanging properties, such as "DEAE Sephadex," e.g. the types A25 and A50, consisting of a cross-linked polydextran in which diethyl aminoethyl groups have been introduced, can be applied successfully. These molecular filters with ion-exchanging properties have been described by P. Flodin (thesis Uppsala (1962)).

In the elution of the active substance from the ion-exchanging material such buffer systems may be used as, for example, sodium acetate-acetic acid, ammonium acetate-acetic acid, pyridine-acetic acid, trimethylamine-acetic acid, triethylamine-acetic acid and salt of tris-(hydroxymethyl)aminomethane (Tris). Preferably elution takes place with a buffer which is soluble in ethanol and remains in solution in the precipitation of the hormone from the eluted fractions, so that no further separation of the gonadotropin and the buffer is necessary.

It is advisable to perform the chromatography over a column of the ion-exchanging material and to equilibrate this column before the application of the hormone solution with a buffer solution of such a low concentration that no active material can be eluted with it. The elution is mostly performed with different buffer solutions of increasing molarity. It has been found that gonadotropins of the highest activity are eluted with buffers with a concentration of 0.1 to 0.5 M and particularly 0.2 to 0.3 M relative to the base. Further, it has proved that the buffers ammonium acetate and Tris are very suitable for the present purification.

It has been found, in accordance with the invention, that every ion-exchanging material has a certain pH range in which an excellent separation of the active substance can be achieved. With CM Sephadex C25 a pH of 4.5–5.2, preferably about 5.0, is applied; with CM Sephadex C50 a pH of 6.8–7.2, preferably about 7.0; with DEAE Sephadex A25 a pH of 7.5–8.4, preferably about 8.0; with DEAE Sephadex A50 a pH of 6.8–7.2, preferably about 7.0.

It has proved to be of advantage to swell the ion-exchanging material to be used before application in distilled water and then to wash it with dilute acid, for instance hydrochloric acid, and after that with distilled water to remove the acid and after that with the buffer solution to be applied. Next the material is equilibrated with the starting buffer. This is preferably done after the material has been passed into a column. It is also possible, however, to perform the present purification in portions by mixing the ion-exchanging material thoroughly with the hormone solution and next to elute the active substance after adsorption at the material with a suitable buffer solution. Naturally the use of a column is to be preferred for the performance of a fractionated elution.

If it is desired to further increase the activity of the preparations obtained by chromatography in accordance with the invention, this can be done quite well by submitting the preparations to a gel filtration through material with the properties of a molecular sieve, such as the known kinds of Sephadex G100, G200 and G150, in the form of a column, such as described by J. Porath and P. Flodin in Nature, 183, 1657 (1959), and the Netherlands patent application 6,402,059. For this purpose the substance to be purified is dissolved in distilled water, next passed on to the column and eluted with distilled water. Preferably an elution rate is applied of from 3 to 6 ml. per hour. By means of the extinction of the eluted fractions, for instance at 280 m$\mu$, the elution is followed and the fractions containing the hormone localised. From the aqueous eluates the hormone is finally separated in a very pure state, for instance by precipitation with alcohol or by lyophilisation, possibly after previous removal of the salts. Separation of the active substance from the eluate by lyophilisation is to be preferred, because it does not entail inactivation of the substance.

For the preparations obtained by the present process the biological activities were determined in the following manner: the HCG or ICSH was assayed against the international standard for chorionic gonadotropin in the seminal vesicle test analogous to the prostate test according to J. A. Loraine (see J. Endocrinol., 6, 319 (1950)), differing only in that to the solutions to be assayed albumin is also added in a quantity by weight of about 0.1% to stabilize the hormone. The seminal vesicle test is specific for the ICSH. The HMG was assayed against the international reference preparation (IRP) HMG 24 in the so-called augmentation test according to S. L. Steelman and F. M. Pohley, in which the activity is expressed in mg.-equivalent IRP (see Endocrinology, 53, 604 (1953)). The augmentation test is specific for the FSH.

Hereafter follow some examples of the treatments according to the invention.

PRE-TREATMENT OF THE ION-EXCHANGING MATERIAL

CM Sephadex C25 was allowed to swell overnight in distilled water. By decanting the settled material small particles suspended in the liquid were separated from the rest. Next the material was washed with 5 parts by volume 0.1 M hydrochloric acid and than with distilled water until the pH was about 4. Next the material was washed with the buffer solution in which the hormone preparation to be purified has to be dissolved. Subsequently the ion-exchanger was poured into a column as a thick free flowing mass. After the material had settled the column was finally balanced with the starting buffer. Also the other ion-exchanging substances used were pre-treated in this manner.

EXAMPLE I

Two thousand mg. of a HCG preparation with an activity of 5000 I.U. per mg. obtained by precipitation with alcohol in an acid medium, were dissolved in 50 ml. of a 0.1 M ammonium acetate solution of pH 5 and passed on to a column of CM Sephadex C25 equilibrated with a 0.1 M ammonium acetate solution in water of pH 5. Next a first fraction of the column was eluted with the said buffer, which fraction contained the material causing the first extinction peak. The eluted substance was precipitated with 4 parts of ethanol and after standing overnight isolated by centrifuging. Next the isolated substance was washed twice with absolute ethanol and dried over silica gel at reduced pressure. Yield 263.4 mg. Biological activity of this preparation in the seminal vesicle test lower than 100 I.U. per mg.

An active fraction was eluted with a 0.3 M ammonium acetate solution of pH 5. The material from this fraction was precipitated in the above manner and isolated. Yield 746 mg.; biological activity 10500 I.U. per mg., hence a yield of units of 77%. With the same eluent a little less active material was further obtained in a yield of 68 mg. with an activity of 7600 I.U. per mg. which was 5.5% of the units originally present.

By a last elution with a solution of 0.5 M ammonium acetate of pH 5 a further 280 mg. of low active material (3400 I.U. per mg.) was eluted from the column. Yield of units of the last fraction 9.5%.

EXAMPLE II

Two thousand five hundred mg. of a HCG preparation with an activity of 3000 I.U. per mg. obtained from a crude preparation by fractionated precipitation with an acid and alcohol according to Dutch patent application No. 6,500,350 were dissolved in a solution of 0.05 M Tris HCl of pH 7 and passed on to a column filled with CM Sephadex C50, equilibrated with an aqueous solution of 0.05 M Tris HCl of pH 7. With this starting buffer inactive material was eluted from the column. Yield 810 mg.; activity in the seminal vesicle test lower than 200 I.U. per mg.

Next active substance was eluted with a solution of 0.2 M Tris HCl of pH 7. The material was precipitated with 4 parts by volume of alcohol and next washed twice with absolute alcohol and dried over silica gel at reduced pressure. Yield 750 mg.; activity of the preparation about 7000 I.U. per mg., equal to 70% of the units of the starting material.

By a third elution with a solution of 0.4 M Tris HCl of pH 7 a further 200 mg. of low active substance (2000 I.U. per mg.) were eluted from the column. All treatments were performed at a temperature between 0 and 10° C.

EXAMPLE III

Two thousand mg. of an HCG preparation with an activity of 4500 I.U. per mg. were dissolved in a solution of 0.1 M Tris HCl of pH 8 and next passed on to a column filled with DEAE Sephadex A25, equilibrated with a solution of 0.1 M Tris HCl in water (pH 8). With this buffer only inactive material was eluted from the column, which material was isolated in the conventional manner, washed and dried. Yield 210 mg.; biological activity in the seminal vesicle test lower than 200 I.U. per mg.

With a 0.3 M Tris HCl buffer solution of pH 8 active material was eluted, which after the conventional isolation was recovered in a yield of 819 mg. with an activity of about 9000 I.U. per mg., which is a yield of 82% on the basis of the amount of units in the starting material.

By a third elution with a solution of 0.6 M Tris HCl of pH 8 a further 553 mg. of practically inactive substance was eluted from the column with a biological activity lower than 200 I.U. per mg. All treatments were performed at a temperature between 0 and 10° C.

EXAMPLE IV

Two thousand five hundred mg. of a HCG preparation with an activity of 6500 I.U. per mg. dissolved in a solution of 0.05 M Tris HCl buffer of pH 7. With the starting buffer 242 mg. of substance were washed from the column, which in the biological assay showed an activity lower than 100 I.U. per mg.

With a buffer solution of 0.1 M Tris HCl (pH 7) active material was eluted, which after isolation was obtained in a yield of 520 mg. Biological activity about 4000 I.U. per mg. With the same eluent another fraction was obtained, which after isolation proved to contain more active material. Yield 350 mg. with an activity of 10500 I.U. per mg., which is a yield in units of 24%.

With a third buffer consisting of a solution of 0.15 M Tris HCl of pH 7 highly active material was eluted, which after isolation showed a biological activity of 15500 I.U. per mg. in a yield of 225 mg. (21% of units). Finally another 310 mg. of substance were eluted with a 0.3 M Tris HCl buffer solution of pH 7; activity 850 I.U. per mg. Elution rate in this chromatography was 50 ml. per hour; the temperature was maintained between 0 and 10° C.

EXAMPLE V

Gel filtration with Sephadex G200

Five hundred mg. of a HCG preparation with an activity of 10500 I.U. per mg. obtained by chromatography with CM Sephadex C25 in accordance with Example I, were dissolved in distilled water and passed on to a column filled with Sephadex G200, equilibrated with distilled water. The column was eluted with distilled water. The elution was followed stepwise by measuring the extinction of the fractions obtained. The active substance was eluted in fractions, the extinctions of which formed an irregularly shaped peak (extinction plotted out against fraction number). The fractions forming the first part of the extinction peak were combined. The active substance was obtained from it by lyophilisation. Obtained 177 mg. of a preparation with a biological activity of 14400 I.U. per mg. From the fractions forming the second part of the extinction peak 114 mg. of substance were obtained with a biological activity of 11300 I.U. per mg. Yield of units of the first fractions 49% and of the last fractions 25%.

EXAMPLE VI

Gel filtration with Sephadex C100

200 mg. of a HCG preparation with an activity of 8700 I.U. per mg. were dissolved in distilled water and passed on to a column filled with Sephadex C100, equilibrated with distilled water.

Elution with distilled water gave a separation of the original preparation into 6 fractions viz. 18 mg. with a potency of 18,000 I.U. per mg., 16 mg. with a potency of 11,800 I.U. per mg., 11.5 mg. with a potency of 11,000 I.U. per mg., 19 mg. with a potency of 8600 I.U. per mg., 17 mg. with a potency of 7500 I.U. per mg. and 25 mg. with a potency of 4100 I.U. per mg.

EXAMPLE VII

On to a CM Sephadex C25 column equilibrated with a 0.05 M ammonium acetate buffer solution of pH 5, were passed 290 mg. of a HMG preparation with an FSH activity in the augmentation test of 350 mg. equivalent IRP per mg. and an ICSH activity of 15 I.U. per mg., dissolved in the said buffer solution. First elution took place with this buffer, after which by precipitation with 4 parts by volume of absolute alcohol in the eluate a precipitate was obtained. It was washed twice with ethanol and after that dried over $P_2O_5$ at reduced pressure. Yield 170 mg. of substance with a FSH activity in the augmentation test of 7 mg. equivalent IRP per mg.

With the next buffer consisting of a 0.2 M ammonium acetate solution of pH 5, an eluate was obtained which after isolation in the above manner yielded a preparation of 8 mg. with an FSH activity of 160 mg. equivalent IRP per mg.

With a third buffer consisting of a solution of 0.4 M ammonium acetate of pH 5 a very active fraction was isolated of 23 mg. of substance with an FSH activity of 2400 mg. equivalent IRP per mg.

With a 1 M buffer 36 mg. of substance with a potency of 300 mg. equivalent IRP per mg. could be isolated.

What is claimed is:

1. Process for the manufacture of a highly purified gonadotropin selected from the group consisting of follicle stimulating hormone, interstitial cell stimulating hormone, prolactin, chorionic gonadotropin, human menopausal gonadotropin and pregnant mare serum gonadotropin, comprising the steps of contacting an aqueous solution of an impure preparation of said gonadotropin with an ion-exchanging cross-linked polydextran selected from the group consisting of the carboxymethyl ether of cross-linked polydextran and the diethylaminoethyl ether of cross-linked polydextran, which ion-exchanging polydextran has been previously swelled in distilled water, then washed with a dilute acid and then washed with distilled water, then eluting said gonadotropin with at least one buffer solution having a concentraton between about 0.1 and about 1.0 molar and a pH between about 4.5 and about 8.4.

2. Process according to claim 1, in which the ion-exchanging material is carboxymethyl cross-linked polydextran.

3. Process according to claim 1, in which the ion-exchanging material is carboxymethyl cross-linked polydextran and the elution is performed at a pH between 4.5 and 5.2.

4. Process according to claim 1, in which the starting material is an HCG preparation of at least about 2000 I.U. per mg.

5. Process according to claim 1, in which the gonadotropins are further purified by gel filtration.

6. Process according to claim 1, in which the ion-exchange material is eluted with a buffer soluble in ethanol.

7. Process according to claim 6, in which the buffer solution comprises a concentration of 0.1 to 0.5 M. of a compound selected from the group consisting of ammonium acetate and a salt of tris-(hydroxymethyl)aminomethane.

References Cited

UNITED STATES PATENTS

| | | | |
|---|---|---|---|
| 3,119,740 | 1/1964 | Steelman et al. | 167—74 |
| 3,290,216 | 12/1966 | Toccaceli | 167—74 |

OTHER REFERENCES

Bettendorf et al., Acta Endocrinologica, 1962, vol. 41, pp. 1–13.

FRANK CACCIAPAGLIA, JR., Primary Examiner

U.S. Cl. X.R.

424—99, 101, 105, 108